United States Patent
Sinky et al.

(10) Patent No.: US 9,231,993 B2
(45) Date of Patent: Jan. 5, 2016

(54) APPARATUS FOR TRANSMITTING ENCODED VIDEO STREAM AND METHOD FOR TRANSMITTING THE SAME

(71) Applicant: LG Display Co., Ltd., Seoul (KR)

(72) Inventors: Mohammed Sinky, Corvallis, OR (US); Ben Lee, Corvallis, OR (US); Chang Gone Kim, Paju-si (KR); Tae Wook Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 14/020,013

(22) Filed: Sep. 6, 2013

(65) Prior Publication Data

US 2015/0071284 A1    Mar. 12, 2015

(51) Int. Cl.
| | |
|---|---|
| *H04L 29/06* | (2006.01) |
| *H04N 21/2343* | (2011.01) |
| *H04N 21/238* | (2011.01) |
| *H04N 21/6375* | (2011.01) |
| *H04N 21/6583* | (2011.01) |
| *H04N 19/70* | (2014.01) |
| *H04N 19/30* | (2014.01) |
| *H04N 19/37* | (2014.01) |

(52) U.S. Cl.
CPC ............ *H04L 65/608* (2013.01); *H04L 65/607* (2013.01); *H04N 19/30* (2014.11); *H04N 19/37* (2014.11); *H04N 19/70* (2014.11); *H04N 21/238* (2013.01); *H04N 21/2343* (2013.01); *H04N 21/6375* (2013.01)

(58) Field of Classification Search
None
See application file for complete search history.

(56) References Cited

U.S. PATENT DOCUMENTS

| | | | | |
|---|---|---|---|---|
| 7,031,259 | B1* | 4/2006 | Guttman et al. | 370/235 |
| 7,969,997 | B1* | 6/2011 | Noh et al. | 370/408 |
| 2004/0056864 | A1* | 3/2004 | Valmiki et al. | 345/531 |
| 2006/0262718 | A1* | 11/2006 | Li et al. | 370/229 |
| 2009/0103635 | A1* | 4/2009 | Pahalawatta | 375/240.27 |
| 2009/0193484 | A1* | 7/2009 | Zhang et al. | 725/112 |
| 2010/0040077 | A1* | 2/2010 | Maze et al. | 370/412 |
| 2010/0110106 | A1* | 5/2010 | MacInnis et al. | 345/629 |
| 2011/0188580 | A1* | 8/2011 | Valmiki et al. | 375/240.24 |
| 2011/0280307 | A1* | 11/2011 | MacInnis et al. | 375/240.15 |
| 2012/0307747 | A1* | 12/2012 | MacInnis et al. | 370/329 |
| 2013/0202025 | A1* | 8/2013 | Baron et al. | 375/240.02 |
| 2014/0334546 | A1* | 11/2014 | Shibahara et al. | 375/240.16 |

* cited by examiner

*Primary Examiner* — Chirag Shah
*Assistant Examiner* — Suk Jin Kang
(74) *Attorney, Agent, or Firm* — Birch, Stewart, Kolasch & Birch, LLP (57) ABSTRACT

Discussed is an apparatus for transmitting an encoded video stream, comprising: a slice generating unit that divides a frame, comprised in a video stream, into at least one or more slice; and a transmitting unit transmitting the slice in units of a packet within a slice deadline, which is a time limit required for transmission of the slice, the transmitting unit that preferentially transmits a header packet that contain a slice header information over other packets, and the slice header that comprises of information necessary for reconstructing the slice, wherein the transmitting unit comprises: a packet transmitter that retransmits the packet when the packet fails to be transmitted within the predetermined retry limit; and a header protector performing control for the header packet to be repeatedly transmitted within the slice deadline even when number of retransmissions of the header packet exceeds the predetermined retry limit.

8 Claims, 8 Drawing Sheets

FIG. 1

Related Art

APPARATUS FOR TRANSMITTING ENCODED VIDEO STREAM AND METHOD FOR TRANSMITTING THE SAME

BACKGROUND

1. Field of the Invention

The present invention relates to an apparatus for transmitting encoded video stream and a method for transmitting the same.

2. Discussion of the Related Art

Playback of digital video is realized by displaying a sequence of still images or frames at a constant rate, which is in units of frames per second (fps). For smooth video playback, frames must satisfy strict playout deadlines. Therefore, all network and playback delays must remain under the time constraint permitted between successive frames.

The H.264 codec is a highly efficient coding standard. Like traditional video compression techniques, H.264 uses predictive methods to reconstruct video sequences. This concept is derived from the fact that digital video typically exhibits spatial redundancy, which denotes similarities between pixels within a frame, and temporal redundancy, which are similarities between pixels in adjacent frames. Frames are divided into units of macroblocks (MBs), which are 16×16-pixel regions, and each MB is either intra-coded or inter-coded. An intra-coded MB is reconstructed using information from the current frame. Inter-coded MBs are reconstructed using information only from the previous frame (predicted), or from both previous and future frames (bi-predicted).

Frames can contain a mixture of different MB types and are labeled according to the types of references made for prediction. For example, a B-frame holds MBs that are bi-predicted; however, it may also contain intra-predicted MBs. A P-frame will contain MBs that are predicted from past frames and may also contain intra-predicted MBs. I-frames contain only intra-predicted MBs and do not reference other frames.

An encoded video consists of a sequence of Group of Pictures (GOP), which is a set of coded pictures that specifies the order of I-, P-, and B-frames.

Figure 1:
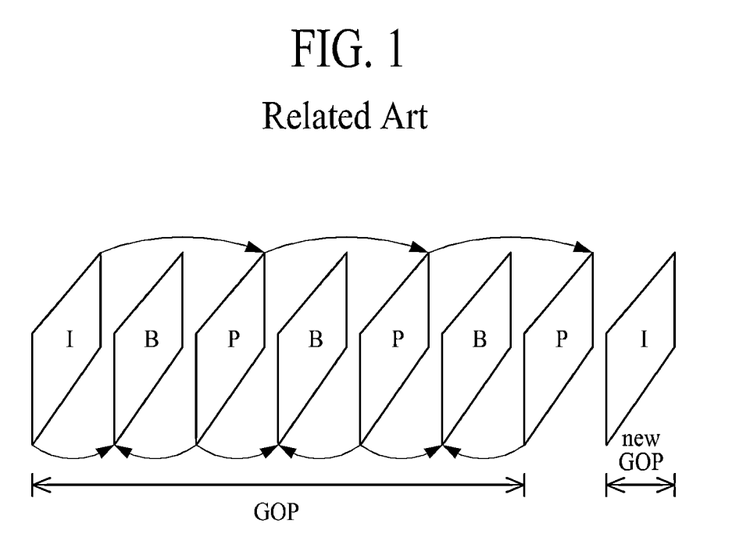
FIG. 1 shows a frame ordering in a GOP in related art. The arrows indicate sources of predicted MBs from adjacent frames.

FIG. 1 shows the frame ordering of a GOP in related art. The arrows indicate sources of predicted MBs from adjacent frames.

As shown in FIG. 1, only I-frames and P-frames serve as reference frames. Due to this interdependency between frames, errors can propagate through frames in a GOP when packet losses occur.

An HD video frame encoded using the H.264 standard is typically subdivided into multiple slices. Slices are classified by the types of MBs they contain.

Figure 2:
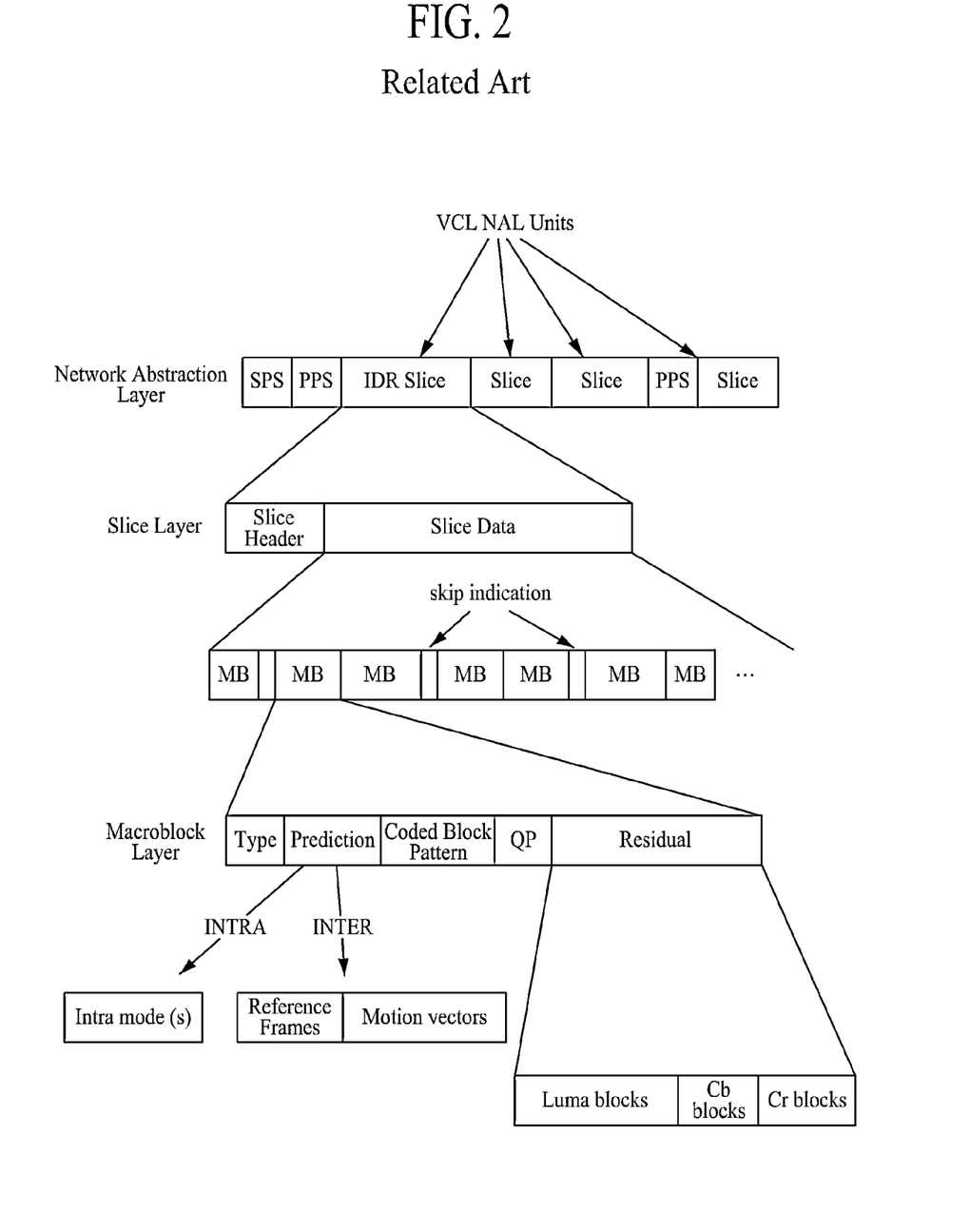
FIG. 2 shows the hierarchical syntax of the H.264 bitstream in related art.

FIG. 2 shows the hierarchical syntax of the H.264 bitstream in related art.

As shown in FIG. 2, the syntax is abstracted in two layers: the Video Coding Layer (VCL) that holds the actual compressed video data and the Network Abstraction Layer (NAL) that encapsulates the compressed data and additional information in a form suitable for packet-based networks.

The Network Abstraction Layer consists of a series of NAL units, which are the minimum units of data decodable by H.264. Three common NAL units are Sequence Parameter Set (SPS), Picture Parameter Sets (PPSs), and slices.

The SPS contains parameters common to an entire video, such as the profile and level the coded video conforms to. Therefore, if a packet containing SPS information is lost, the entire video cannot be decoded. The PPS contains common parameters that are applied to a sequence of frames, such as the entropy coding mode. If the PPS for a sequence of frames is lost, then these frames cannot be decoded. As mentioned before, a slice is the main unit for constructing a frame, and a frame can have either a single slice or multiple slices.

Each slice contains a slice header followed by video data containing MBs. A slice header contains information common to all the MBs within a slice. If a slice header is lost, then the entire slice cannot be decoded even if the slice data is properly received.

Figure 3A:
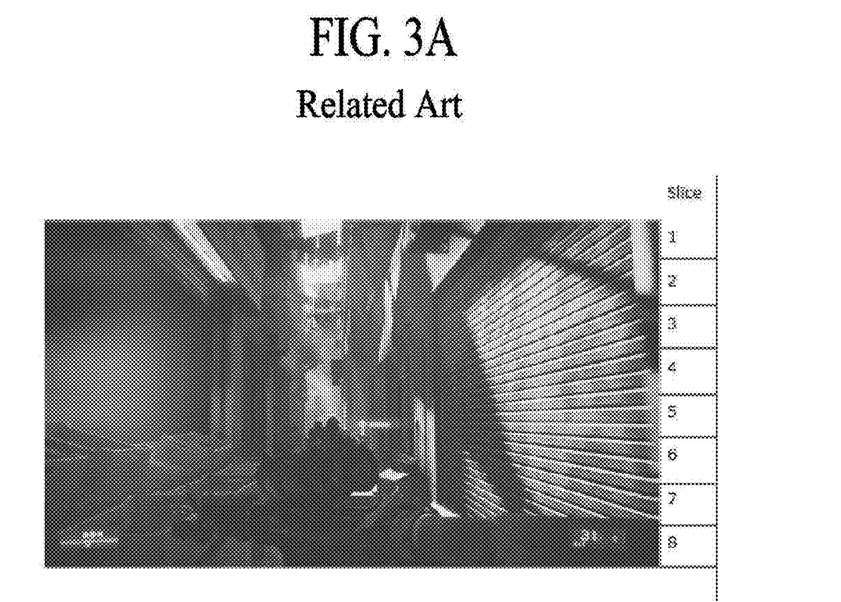
FIG. 3A and FIG. 3B show the effect of packet loss on a frame in related art.
Figure 3B:
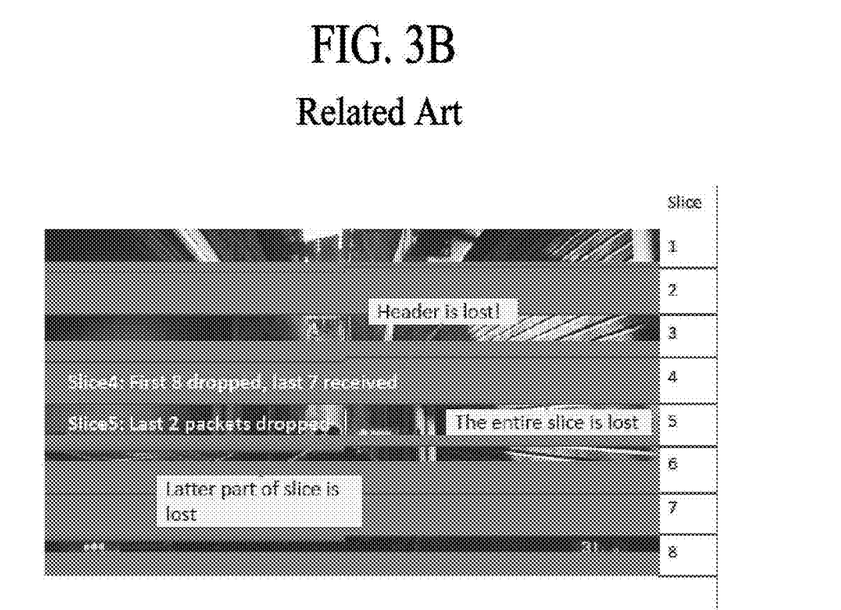

FIG. 3A and FIG. 3B show the effect of packet loss on a frame in related art. FIG. 3A shows the original transmitted frame, while FIG. 3B shows the received frame with some information missing due to packet loss.

As shown in FIG. 3B, the slice header for Slice 4 is lost, rendering the entire slice undecodable. In contrast, the slice header for Slice 5 is received but the last two Real Time Protocol (RTP) packets are lost, which allows most of the slice to be decoded.

SUMMARY

Accordingly, the present invention is directed to provide an apparatus for transmitting encoded video stream and a method for transmitting the same that substantially obviates one or more problems due to limitations and disadvantages of the related art.

An aspect of the present invention is directed to provide an apparatus for transmission of encoded video stream and a method for the same, which preferentially transmits a header packet that contain a slice header information over other packets.

Another aspect of the present invention is directed to provide an apparatus for transmission of encoded video stream and a method for the same, which estimates channel conditions, and selects appropriate retry limits.

Another aspect of the present invention is directed to provide a apparatus for transmission of encoded video stream and a method for the same, which estimates packet arrival times using MAC and physical layer parameters, and compares the estimates with corresponding playout deadlines in making decisions to entirely drop a packet.

In addition to the aforementioned objects of the present invention, other features and advantages of the present invention will be described below, which will be clearly understood by those skilled in the art from descriptions below.

In addition to the aforementioned features and effects of the present invention, other features and effects of the present invention can be newly construed from the embodiments of the present invention.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an apparatus for transmitting an encoded video stream is provided, which comprised of: a slice generating unit that divides a frame, comprised in a video stream, into at least one or more slice; and a transmitting unit transmitting the slice in units of a packet within a slice deadline, which is a time limit required for transmission of the slice, the transmitting unit that preferentially transmits a header packet that contain a slice header information over other packets, and the slice header that comprises of information necessary for reconstructing the slice, wherein the transmitting unit comprises: a packet transmitter that retransmits the packet when the packet fails to be transmitted within the predetermined retry limit and, transmitting a next available packet when the current packet succeeds in transmission; and a header protector performing control for the header packet to be repeatedly transmitted within the slice deadline even when number of retransmissions of the header packet exceeds the predetermined retry limit.

In another aspect of the present invention, a method for transmitting a frame including at least one or more slice is provided, comprising of: transmitting the slice in units of a packet within a slice deadline, which is the time limit required for transmission of the slice, the transmitting unit that preferentially transmits a header packet that contain a slice header information over other packets, and the slice header comprising of information necessary for restoring the slice; and retransmitting the packet within a predetermined retry limit when the packet fails to be transmitted, and when the packet succeeds in transmission, a transmission of the next available packet begins, wherein the retransmitting the packet comprises retransmitting the header packet even when the number of retransmissions of the header packer exceeds the predetermined retry limit, under the time constraint of the slice deadline.

It is to be understood that both the foregoing general description and the following detailed description of the present invention are exemplary and explanatory and are intended to provide further explanation of the invention as claimed. Further, research for the invention was supported in part by LCD Laboratory, LG Display Co., Ltd., and the Ministry of Education Science and Technology (MEST).

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, an apparatus for transmission of an encoded video stream and a method for the same according to the present invention will be described in detail with reference to the accompanying drawings.

The present invention involves an adaptive MAC layer retransmission technique for H.264 video titled Dynamic Retry Adaptation Scheme for H.264 video (DRAS.264). The present invention makes use of specific details embedded in the H.264 bitstream along with real-time monitoring of network conditions to offer protection for any H.264-encoded video regardless of the profile and level used.

Furthermore, the present invention complies with the reality of H.264 videos, which have slices and variable frame sizes. The MAC layer retransmission limits are dynamically adjusted based on the packet type inferred from the H.264 bitstream and specific network metrics monitored during the course of video transmission. Although the present invention specifically targets H.264 videos, it also applies to any videos that contain slice-based frames, including upcoming H.265 videos.

The IEEE 802.11 Distributed Coordination Function (DCF) is the core mechanism of the MAC protocol that controls access to a wireless network. In 802.11 networks, each station monitors the wireless medium for activity. Stations monitor the medium in intervals of time slots. When the medium is detected to be idle for a specified period of $T_{DIFS}$, stations are permitted to transmit. A summary of the important time intervals of the 802.11 DCF is provided in Table 1.

TABLE 1

| Duration | Description | Values | | | |
| --- | --- | --- | --- | --- | --- |
| | | 802.11a | 802.11b | 802.11g | 802.11n |
| $T_{SIFS}$ | Short interframe space | 16 µs | 10 µs | 10 µs | 10 µs |
| $T_{DIFS}$ | DCF interframe space | 34 µs | 50 µs | 28 µs | 28 µs |
| $t_{slot}$ | Time slot | 9 µs | 20 µs | 9 µs | 9 µs |
| $T_{ACK}$ | Time required to transmit ACK frame | Depends on data rate | | | |
| $T_{frame}$ | Time required to transmit payload | Depends on payload size and data rate | | | |

To avoid collisions (i.e., simultaneous transmissions from multiple stations), an exponential backoff mechanism is employed whereby a random time slot, also referred to as backoff time slot (BO), is chosen from a contention window (CW).

The CW is a pre-defined time interval divided in units of time slots and is doubled in size after each successive collision. When the CW reaches a pre-defined maximum value, it remains at this value until a successful transmission takes place or the retry limit for the packet is reached (i.e., dropped).

Any station operating in an 802.11 wireless network can be classified to be in one of four states: success, collision, backoff, and deferred. These states together with the durations given in Table 1 can be utilized to formulate a set of parameters that affect end-to-end delay of link layer packets.

TABLE 2

| State | Duration |
| --- | --- |
| success | $T_{success} = T_{frame} + T_{SIFS} + T_{ACK}$ |
| collision | $T_{collision} = T_{frame} + T_{SIFS} + T_{ACK}$ |
| deferred | $T_{deferred} = T_{frame} + T_{SIFS} + T_{ACK}$ |
| backoff | $T_{backoff} = BO_r \times t_{slot} \in (CW_r \times t_{slot})$ |

Table 2 provides the timing calculations for each state with the assumption that all packets are of equal length. Based on this assumption, the time a packet will spend from the start of transmission to the time it expects to receive an acknowledgement (ACK) packet is equivalent for success and collision times.

A distinction is made between physically receiving an ACK (i.e., success) versus not receiving an ACK (i.e., collision), and this will be addressed in the model used to predict overall packet delay.

The computation for deferral time is based on how long other stations seize the medium during transmission. Since our assumption considers packets of equal length, this time interval represents when other stations begin transmissions and when they expect to receive ACKs. Thus, this duration is also equivalent to those used for success and collision times. Finally, $CW_r$ is the value of the contention window for the $r^{th}$ retry.

The present invention is to be implemented through a combination of monitoring packet delay and observing bitstream contents. The essential part of the present invention is to closely monitor the behavior of 802.11 wireless networks, which enables estimation of packet delays resulting from the MAC layer.

Real-time parsing of the H.264 bitstream allows for on-the-fly detection of packet importance. Based on this information, the MAC retry limit may need to be increased for specific packets during unfavorable network conditions depending on the level of importance inferred from the bitstream. Moreover, some packets may need to be discarded altogether to avoid unnecessary transmissions that would otherwise deliver packets beyond their corresponding frame playout deadlines.

The important metrics to consider for 802.11 wireless networks are based on the four main states outlined above: success, collision, backoff, and deferred.

Each state represents a certain component of delay that contributes to the overall packet delay. Running averages of how long packets remain in each state are tallied for the purposes of prediction. It is important to note that packet delays can only be obtained for successfully received packets, since delays for dropped packets are unknown.

Three main factors affect the total delay a packet experiences from the time it is transmitted to the time it is successfully acknowledged: (1) the number of collisions that take place when transmitting a packet, (2) the backoff slot chosen for each retry attempt, and (3) how many times a station is deferred.

The first two factors are used to determine the average delay associated with the number of collisions and backoff times. The last factor is used to obtain the average delay associated with how long other stations seize the medium. These metrics are defined as below:

$n_c$: the number of collisions experienced by the primary station sending the video, $BO_r$: the back off slot chosen for retry attempt r, $n_{tx}$: the number of transmissions by other stations before the primary station successfully receives an ACK.

These metrics are used to define the total delay for a packet, $T_{delay}^{pkt}$, given by the following equation 1:

$$T_{delay}^{pkt} = \sum_{r=0}^{n_c} T_{BO_r} + n_c T_{busy} + n_{tx} T_{busy} + T_{success} + (n_c + n_{tx}) T_{DIFS} \quad \text{[Equation 1]}$$

The components of Eq. 1 cover the four main states of the 802.11 MAC layer operation, which are described in detail below:

$T_{BO_r}$ represents the backoff delay associated with the $r^{th}$ retry, i.e., $T_{BO_r} = BO_r t_{slot}$ such that $BO_r \in [0, CW_r]$, where $CW_r = a2^r - 1$. The constant a depends on the standard used. For example, 802.11a uses a=16 and 802.11b uses a=32.

$T_{busy}$ denotes the time the medium is busy by another station. This can mean either (1) the primary station is in deferral or (2) a collision is taking place, which explains the usage of $n_{tx}$ and $n_c$, respectively, in the equation. More specifically, $T_{busy}$ is defined as $T_{busy} = T_{frame} + T_{SIFS} + T_{ACK}$ where $T_{frame}$, $T_{SIFS}$ and $T_{ACK}$ are the MAC specific delays outlined in Table 1.

$T_{success}$ is the time associated for successful transmission of a packet, and it is equivalent to $T_{busy}$.

$T_{DIFS}$ is the MAC specific duration after each transmission for which the medium must be sensed idle before retransmitting (indicated in Table 1).

Eq. 1 can be further simplified to Eq. 2:

$$T_{delay}^{pkt} = \underbrace{T_{BO_0} + T_{success}}_{Success} + \underbrace{\sum_{r=1}^{n_c} T_{BO_r}}_{Backoff} + \underbrace{(n_c + n_{tx})(T_{busy} + T_{DIFS})}_{Collisions\ and\ Deferral} \quad \text{[Equation 2]}$$

In the default MAC layer protocol, a packet can only absorb a maximum of 6 retransmissions (7 total transmissions including the first attempt). Thus, each retry attempt has an average delay associated with it throughout the course of 802.11 network operation. This delay can be obtained by monitoring the average backoff window size per attempt, $E[BO_r]$, and the average number of transmissions other stations gain access to the medium, $E[n_{tx}]$.

Furthermore, upon successful transmission of a packet, $n_c = r \leq R$ can be reduced, where R is the maximum number of retries (R=6 by default). The estimated packet delay, $E[_{delay_r}^{pkt}]$, can then be performed based on the number of retries using the following Eq. 3:

$$E[_{delay_r}^{pkt}] = T_{success} + E[BO_r]t_{slot} + r(T_{collision} + T_{DIFS}) + E[n_{tx}](T_{busy} + T_{DIFS}), \quad \text{[Equation 3]}$$

where $t_{slot}$ is the duration of a time slot (see Table 1) and $T_{collision} = T_{busy}$. Eq. 3 provides a predicted packet delay for each retry value r based on the averages of $BO_r$ and $n_{tx}$, which are $E[BO_r]$ and $E[n_{tx}]$, respectively. Thus, an array of predicted values is generated by Eq. 3 with the index being the retry attempt r.

The present invention focuses on two parameters: frame size and the level of importance computed per packet of the encoded bitstream. These variables are all related and considered known for existing methods due to the preprocessing steps used to extract packet importance. However, without preprocessing, frame size and packet importance are unavailable and must be extracted dynamically from the streamed H.264 content.

Therefore, the proposed method processes the H.264 bitstream on the fly, similar to performing running averages to monitor packet delays, and extracts average frame sizes that are eventually used to determine per packet deadlines.

As shown in FIG. 3, the slice nature of the codec imposes a clear level of importance for each packet. Slice headers consist of the most important information needed by a decoder followed by the data composed of actual coded video. When slice headers are missing, the decoder is unable to reconstruct the slice. Use of variable length coding by H.264, makes each packet of a slice only as important as the successful delivery of its preceding packet. Thus, for any packet within a slice that is lost, all subsequent packets should be purged to avoid sending unusable information.

Figure 4:
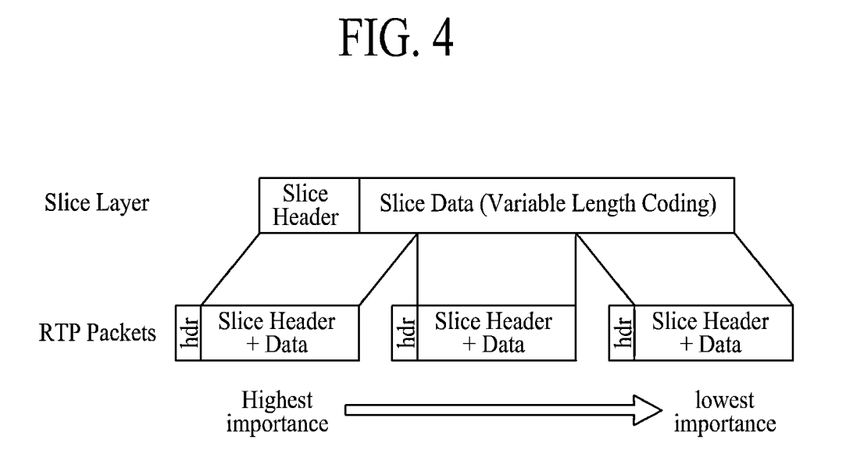
FIG. 4 illustrates the partitioning of slices into Real Time Protocol (RTP) packets and their corresponding importance according to the present invention.

FIG. 4 illustrates the partitioning of slices into Real Time Protocol (RTP) packets and their corresponding importance according to the present invention.

As illustrated in FIG. 4, a header packet including the slice header is more important than the others because the whole slice cannot be reconstructed without the slice header.

Figure 5:
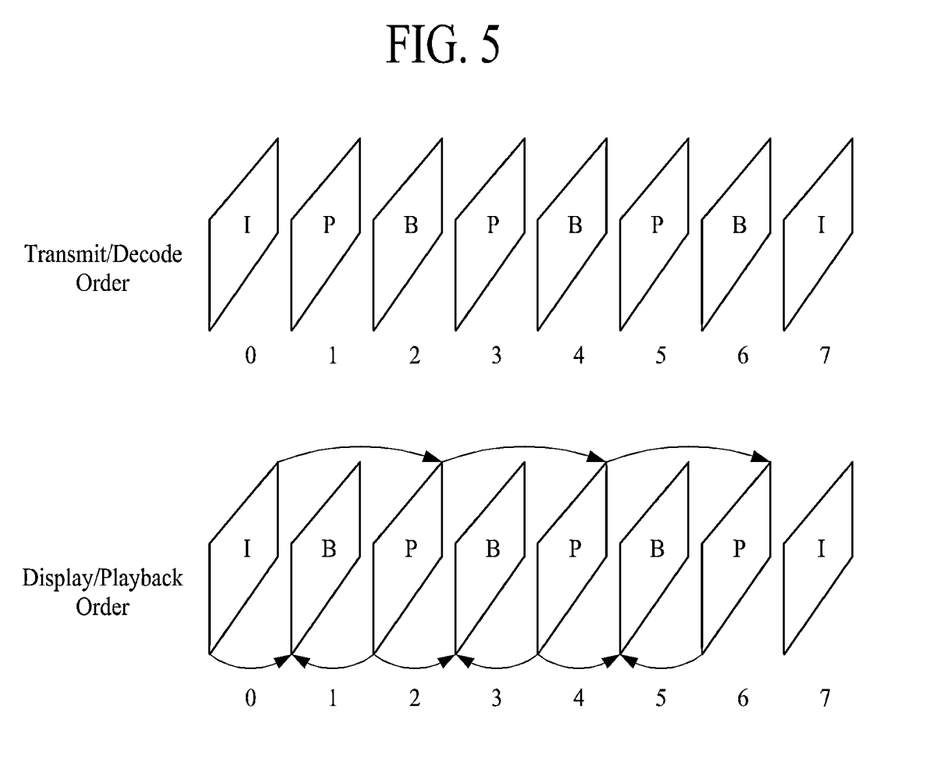
FIG. 5 shows the decoding order and the display order according to the present invention.

FIG. 5 shows decoding order and display order during video streaming.

As shown in FIG. 5, at the GOP level, frames are transmitted in decoding order, which is different than the display order. This ensures that all reference frames are decoded before corresponding inter-predicted frames. Therefore, at the frame level, information is also organized in order of importance.

One of the essential aspects of the present invention lies in extracting the level of importance for each packet of the streamed video. Typically, preprocessing techniques are used in order to rank the packets of video based on importance, which in turn facilitates the assignment of retry limits during video streaming. However, error propagation behavior of pre-encoded H.264 video is not available at the packet level. Thus, the NAL unit structure of the H.264 codec is exploited to develop a protection algorithm for smooth video playback without the need to know specific details of the video content.

The packet importance within a slice as shown in FIG. 4 is considered in the present invention to provide protection at the slice level of compressed video. In order to utilize these types of protection, a frame deadline, $D_{frame}$, is defined as Eq. 4:

$$D_{frame} = T_{init} + n_{frame}\lambda, \quad \text{[Equation 4]}$$

where $T_{init}$ is the initial startup delay before the video is played at the receiver, $n_{frame}$ is the frame number of the current frame to be played back, and $\lambda = 1/\text{fps}$ is the frame period or the interval between playback of each frame. $T_{init}$ is also referred to as the jitter time and implemented with an appropriately sized buffer, or jitter buffer, to smooth video playout.

When multiple slices are used to encode video, the deadline per slice can be calculated as Eq. 5:

$$D_{slice} = T_{init} + n_{frame}\frac{\lambda}{n_{slice}}, \quad \text{[Equation 5]}$$

where $n_{slice}$ is the number of slices per frame. Since the relative importance of each individual slice of a frame is not known, the frame period is uniformly allocated amongst all slices of the frame.

Figure 6:
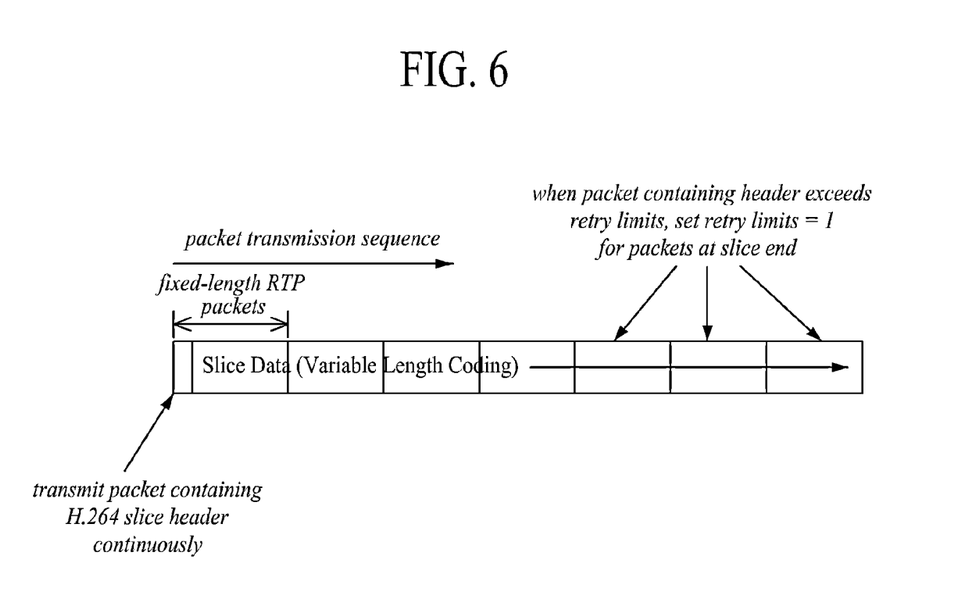
FIG. 6 illustrates a slice-protection transmission scheme according to the present invention.

FIG. 6 illustrates the slice-protection transmission scheme according to the present invention.

As illustrated in FIG. 6, slice-protection behaves as follows:

(1) Each packet that holds a slice header is transmitted repeatedly under the time constraint as Eq. 6:

$$t_{slice} + (n_{over}+1)T_{delay}^{slc-hdr} < D_{slice}, \quad \text{[Equation 6]}$$

where $t_{slice}$ represents the time the slice started transmission, $T_{delay}^{slc-hdr}$ is obtained from Eq. 1 and represents the delay that the packet containing the slice header experiences, and $n_{over}$ is the number of times the packet exceeded the retry limit. When the retry limit is exceeded, the slice protection algorithm will present the MAC layer with the same packet containing the slice header. The normal MAC layer operation considers the incoming packet as new and starts transmission with $CW = CW_{min} = a2^r - 1$.

In addition, the MAC retry timeout notification to the upper layers is simply ignored, as is the case in User Datagram Protocol (UDP). This additional opportunity, in essence, offers higher protection to any packet with an H.264 slice header as part of the payload. Furthermore, the added protection comes without any modification to the default behavior of the MAC layer DCF operation, which is one novelty of this invention.

(2) The extra transmission of the header packet is compensated by reducing the retry limit of the estimated final packet of the slice to 1. Given the fact that the number of packets per slice is not known ahead of time, an estimation needs to be performed based on statistical information obtained dynamically.

(3) Repeat steps (1) and (2) until the slice header is successfully transmitted. For step (2), packets are traversed in reverse order from the end of the slice.

(4) The remaining packets of the slice are transmitted using a newly computed deadline per slice packet. If the header was successfully transmitted and the condition in step (1) holds, then the time available before the slice deadline, $t_{remaining}$, is given by Eq. 7.

$$t_{remaining} = D_{slice} - (t_{slice} + (n_{over}+1)T_{delay}^{slc-hdr}), \quad \text{[Equation 7]}$$

which allows the remaining per packet deadlines to be computed using the following Eq. 8:

$$D_{pkt} = \frac{D_{slice} - t_{remaining}}{n_{pkt} - (n_{over}+1)}, \quad \text{[Equation 8]}$$

where $n_{pkt}$ is the number of packets in the slice. Retry limits for the packets following the header are chosen using Eq. 9.

$$E[T_{delay_r}] \leq D_{pkt} \quad \text{[Equation 9]}$$

Recall that $E[T_{delay_r}]$ is defined by Eq. 3 and represents the average delay for the $r^{th}$ retry.

(5) Let $E[T_{delay_r}^{pkt}]$ represent the estimated delay of the current packet being transmitted defined in Eq. 3. If at any time $E[T_{delay_r}^{pkt}] > t_{remaining}$, a deadline violation will occur and the packet is dropped along with subsequent packets of the slice.

Several important details must be considered for the slice protection transmission scheme shown in FIG. 6. Since the extracted number of packets per slice is not known beforehand, it must be estimated. This is done by storing the average number of packets per slice type (IDR, I, P, or B) during streaming and using the averages as approximations for the current slice under consideration for transmission.

In step (4), the packets at the end of the slice are ignored by not factoring them into the calculation for per packet deadline. This buys time for packets at the start of the slice that immediately follow the slice header, but at the same time it is still possible for the last packets of the slice to be transmitted because the average delay per packet is considered for retry adjustment. Thus, spare time may still be available for the end-of-slice packets that were originally ignored.

In addition, $t_{remaining}$ is continuously computed by Eq. 10 below.

$$t_{remaining} = D_{slice} - t, \quad \text{[Equation 10]}$$

where t is the current time and $D_{slice}$ is the slice deadline computed in Eq. 5.

Finally, the transmission of slice headers can be fine-tuned for fast delivery by setting the retry limit to a low value, reducing the wait time associated with backoff delays, which is another novelty this invention.

Figure 7:
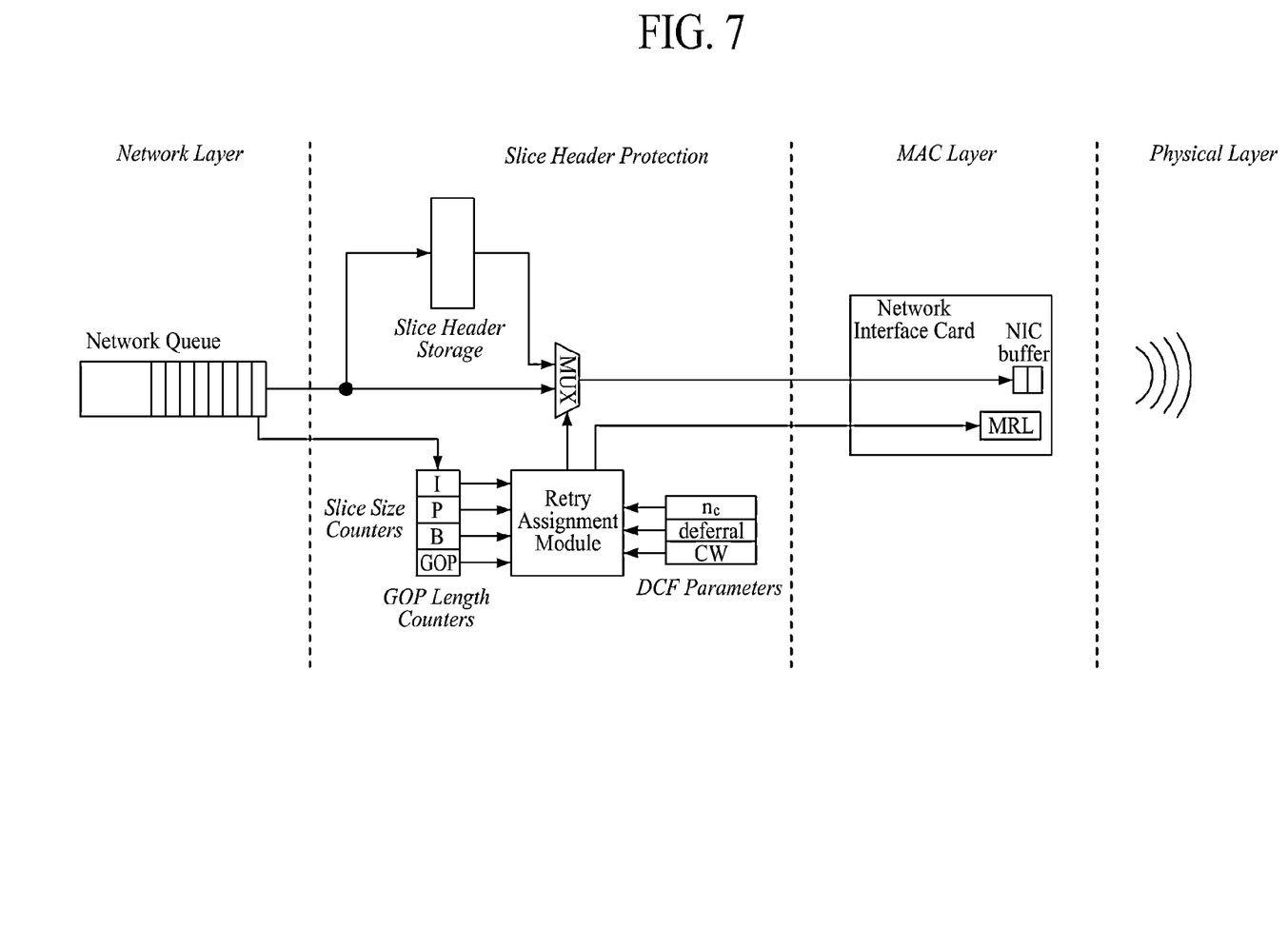
FIG. 7 shows an example architecture for the slice-protection scheme according to the present invention.

FIG. 7 shows architecture for the slice-protection scheme according to the present invention.

The implementation of the present invention lies within the interface between the network and link layers. The Retry Assignment Module is the main component of the system, which gathers DCF parameters from the Network Interface Card (NIC), slice information from the Slice Size Counters, which are responsible for parsing the H.264 bitstream, and GOP information from the GOP Length Counter. The Retry Assignment Module then applies deadline calculations to set corresponding retry limits per packet. The two blocks within the NIC represent the packet being sent and the Maximum Retry Limit (MRL) assigned to that packet. The slice protection is implemented within the dashed-line box and consists of Slice Header Storage and a multiplexer that feeds the appropriate packet to the wireless interface. When a slice header is dropped by the MAC layer due to excessive retries, the multiplexer will reselect the slice header to be sent through the NIC. Once the slice header is transmitted successfully, the next waiting packet in the Network Queue is dequeued and processed.

Embodiment

Figure 8:
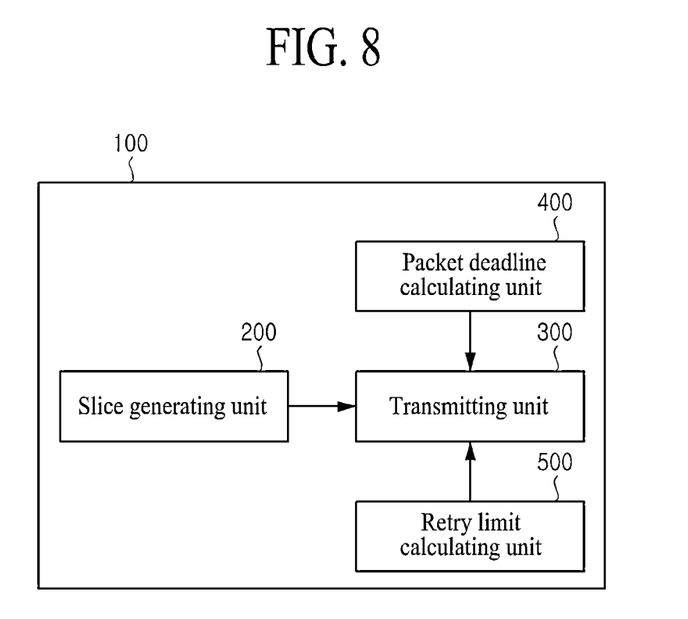
FIG. 8 illustrates an embodiment of the apparatus for transmission of an encoded video stream according to the present invention.

FIG. 8 illustrates an embodiment of the apparatus for transmission of encoded video stream according to the present invention.

As seen in FIG. 8, an apparatus for transmitting an encoded video stream 100 according to the present invention includes a slice generation unit 200, a transmitting unit 300, a packet deadline calculating unit 400, and a retry limit adjustment unit 500.

The slice generating unit 200 divides a frame, comprised in a video stream, into at least one or more slices. A slice comprises at least one or more marcoblock (MB).

A slice comprises a slice header and slice data. The slice header contains information common to all the MBs within a slice. The slice header consists of the most important information needed by a decoder, which is followed by the data composed of actual coded video. When slice headers are missing, the decoder is unable to reconstruct the whole slice.

The transmitting unit 300 transmits the slice in units of a packet within a slice deadline, which is a time limit required for transmission of the slice, the transmitting unit 300 that preferentially transmits a header packet that contain a slice header information over other packets and the slice header comprising information necessary for reconstructing the slice The slice deadline is variably set depending on the slice type.

Figure 9:
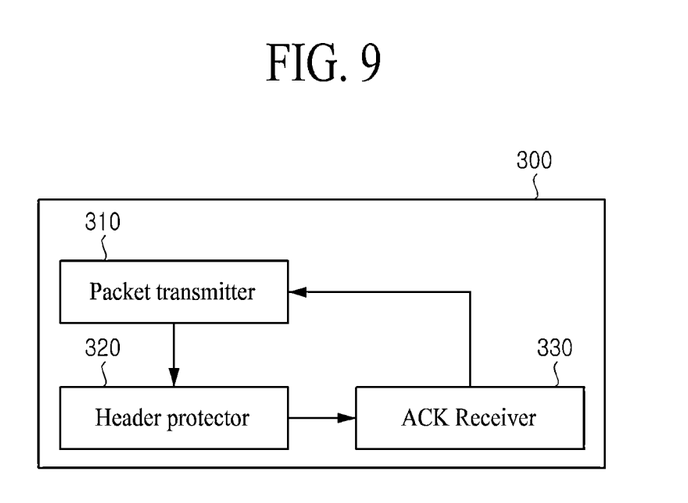
FIG. 9 illustrates an embodiment of the transmitting unit according to the present invention.

FIG. 9 illustrates an embodiment of the transmitting unit according to the present invention.

As seen in FIG. 9, the transmitting unit 300 according to the present invention includes a packet transmitter 310, a header protector 320, and an ACK receiver 330.

The packet transmitter 310 retransmits when the packet is unsuccessful within the predetermined retry limit, and when the packet succeeds in transmission, 310 transmits the next packet. In an embodiment, the retry default limit is 6. In this example, a packet can only absorb a maximum of 6 retransmissions (7 total transmissions including the first attempt).

The header protector 320 performs control for the header packet to be repeatedly transmitted within the slice deadline even when the number of retransmissions of the header packet exceeds the predetermined retry limit.

In an embodiment, the header protector 320, resets the number of retransmissions to the original value when the header packet is dropped after exceeding the retry limit. Then, the packet transmitter 310 transmits the header packet again.

The ACK receiver 330 determines whether the header packet succeeds in transmission.

The packet deadline calculating unit 400 dynamically calculating a packet deadline that is a transmission time limit for each of residual non-transmission packets, in the middle of transmitting the slice, the packet deadline being calculated by dividing a remaining time by a retransmission variable, wherein, the remaining time is a value of a time, taken in transmitting the header packet, subtracted from the slice deadline, and the retransmission variable is a value that is calculated with the number of retransmissions of the packet.

In an embodiment, the packet deadline, $D_{pkt}$, is calculated as expressed in the following Equation;

$$D_{pkt} = \frac{t_{remaining}}{n_{pkt} - (n_{over} + 1)},$$

where $t_{remaining}$ denotes the remaining time defined in Eq. 10, $n_{pkt}$ denotes the number of packets comprised in the slice, and $n_{over}$ denotes number of times the retry limit is exceeded.

The retry limit calculating unit 500 dynamically sets the retry limit such that the predicted packet delay $E[T_{delay_r}^{pkt}]$, which is estimated based on the number of retransmissions occurring in the middle of transmitting the packet, satisfies a condition in which the packet deadline, which is a transmission time limit for each packet, is greater than or equal to the predicted packet delay.

In an embodiment, the predicted packet delay is calculated as expressed in the following equation;

$$E[T_{delay_r}^{pkt}] = T_{success} + E[BO_r]t_{slot} + r(T_{collision} + T_{DIFS}) + E[n_{tx_r}](T_{busy} + T_{DIFS}),$$

where $T_{success}$ denotes the time taken to successfully transmit a packet, $E[BO_r]$ denotes the average backoff window size for each attempt, $E[n_{tx_r}]$ denotes the average number of transmissions for other stations accessing the medium, $t_{slot}$ denotes a time slot interval, r denotes the number of attempted retransmissions, $T_{collision}$ denotes the time wasted during a collision, $T_{DIFS}$ denotes an idle duration as specified by the 802.11 standard for which the medium must wait before retransmitting, and $T_{busy}$ denotes the time which the medium is accessed by other stations.

An encoded video stream transmitting method of transmitting a frame including at least one or more slices, comprising: transmitting the slice in units of a packet within a slice deadline, which is time limit required for transmission of the slice, the transmitting unit that preferentially transmits a header packet that contain a slice header information over other packets, and the slice header comprising information necessary for restoring the slice; and retransmitting the packet within the predetermined retry limit when the packet fails to be transmitted and, when the packet succeeds in transmission, transmitting the next available packet, wherein the retransmitting of the packet comprises repeatedly transmitting header packets even when the number of retransmissions of the header packet exceeds the retry limit under the time constraints of the slice deadline.

Figure 10:
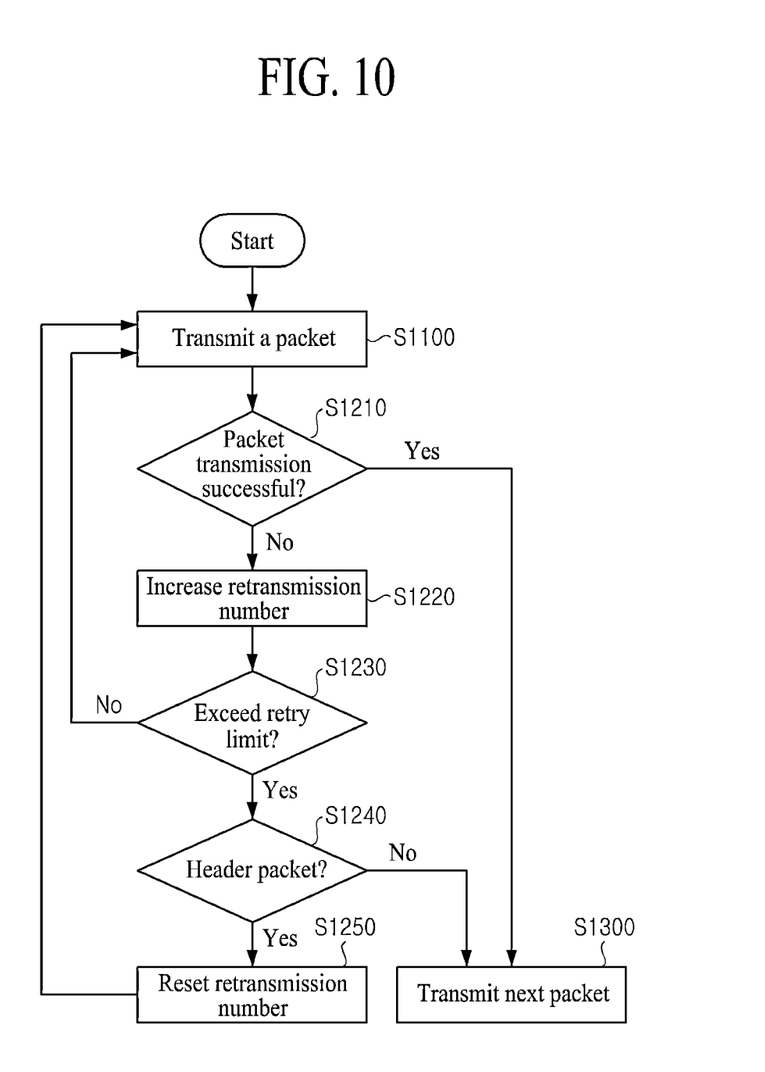
FIG. 10 illustrates an embodiment of the method for transmission of an encoded video stream according to the present invention.

FIG. 10 illustrates an embodiment of method for transmission of an encoded video stream according to the present invention.

As illustrated in FIG. 10, in the operation S1100, first, the method for transmission of an encoded video stream according to the present invention consists of transmitting the slice in units of a packet within a slice deadline, which is the time limit required for transmission of the slice, the transmitting unit that preferentially transmits a header packet that contain a slice header information over other packets, and the slice header comprising of information necessary for restoring the slice.

Next, the present invention determines whether the number of retransmissions exceeds the retry limit in the operation S1230. If the number of retransmissions does not exceed the retry limit, the present invention retransmits the packet in the operation S1100. If the number of retransmissions exceeds the retry limit, the present invention determines whether the packet is the header packet in operation S1240.

If the packet is a header packet, the present invention resets the number of retransmissions in operation S1250 and retransmits the header packet in operation S1100. If the packet is not a header packet, the present invention drops the packet and sends the next available packet in operation S1300.

The present invention dynamically calculates individual packet deadlines, which are transmission time limits for all packets of a slice following the header packet. The packet deadline is calculated by dividing the time remaining from the current time until the slice deadline. This is found by subtracting the time taken to transmit the header packet from the slice deadline, which is given by Eq. 10, and dividing that quantity by the number of packets in the slice. The number of packets in the slice is adjusted to a lower number by discarding the final packets from the computation for every instance the slice header transmission exceeds the retry limit.

In an embodiment, the packet deadline $D_{pkt}$ is calculated as expressed in the following equation;

$$D_{pkt} = \frac{t_{remaining}}{n_{pkt} - (n_{over} + 1)},$$

where $t_{remaining}$ denotes the remaining time, $n_{pkt}$ denotes the number of packets comprised in the slice, and $n_{over}$ denotes the number of times the retry limit is exceeded by the header packet.

The present invention dynamically resets the retry limit such that predicted packet delay $E[T_{delay_r}^{pkt}]$, which is a running average developed throughout the course of packet transmission, satisfies the condition in which the packet deadline, which is the transmission time limit for each packet, is greater than or equal to the predicted packet transmission delay.

In an embodiment, the predicted packet delay is calculated as expressed in the following Equation;

$$E[T_{delay_r}^{pkt}] = T_{success} + E[BO_r]t_{slot} + r(T_{collision} + T_{DIFS}) + E[n_{tx_r}](T_{busy} + T_{DIFS}),$$

where $T_{success}$ denotes the time spent on the final attempt for which an acknowledgement (ACK) is successfully received and thus a successful packet transmission, $E[BO_r]$ denotes the average backoff window size for each attempt, $E[n_{tx_r}]$ denotes the average number of transmissions for other stations accessing the medium, $t_{slot}$ denotes a time slot interval, r denotes the number of attempted retransmissions, $T_{collision}$ denotes the time wasted in a collision, $T_{DIFS}$ denotes a defined time for which the medium must be idle before retransmitting or starting transmission of a new packet, and $T_{busy}$ denotes times that other stations are accessing the medium.

As described above, the present invention transmits a header packet repeatedly even after exceeding the predefined retry limit, thus increasing the probability of successful transmission of the slice header. Also, the present invention does not require any modifications to the underlying MAC layer operation, aside from the real-time adjustments of retry limit, making it widely deployable into existing 802.11 networks.

Furthermore, the present invention offers high flexibility in covering the many variants of H.264-encoded video making it an attractive solution for maintaining Quality of Service (QoS) during wireless video streaming.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for transmitting an encoded video stream, comprising:
    a slice generating unit that divides a frame, comprised in a video stream, into at least one or more slice;
    a transmitting unit transmitting the slice in units of a packet within a slice deadline, which is a time limit required for transmission of the slice, wherein the transmitting unit preferentially transmits a header packet that contains slice header information over other packets, and the slice header information includes information necessary for reconstructing the slice; and
    a packet deadline calulating unit configured to dynamically calculate a packet deadline, which is a transmission time limit for each packet of a slice following the header packet, the packet deadline is calculated by dividing the remaining time to the slice deadline by the number of packets in the slice,
    wherein the remaining time is calculated by subtracting the current time after the header was successfully transmitted from the slice deadline, and
    wherein the transmitting unit comprises:
        a packet transmitter that retransmits the packet when the packet fails to be transmitted within a predetermined retry limit and, transmitting a next available packet when a current packet succeeds in transmission; and
        a header protector performing control for the header packet to be repeatedly transmitted within the slice deadline even when a number of retransmissions of the header packet exceeds the predetermined retry limit.

2. The apparatus of claim 1, wherein the packet deadline $D_{pkt}$ is calculated as expressed in the following equation;

$$D_{pkt} = \frac{t_{remaining}}{n_{pkt} - (n_{over} + 1)}$$

where $t_{remaining}$ denotes the remaining time, $n_{pkt}$ denotes number of packets comprised in the slice, and $n_{over}$ denotes the number of times the header packet exceeds the retry limit.

3. The apparatus of claim 1, further comprising a retry limit calculating unit dynamically sets the retry limit such that a predicted packet delay $E[T_{delay_r}^{pkt}]$, which is a running average of the delay incurred per retry attempt, satisfies a condition in which the predicted packet delay is less than or equal to the packet deadline, which is a time limit required for each packet.

4. The apparatus of claim 3, wherein the predicted packet delay is calculated based on the following equation;

$$E[T_{delay_r}^{pkt}] = T_{success} + E[BO_r]t_{slot} + r(T_{collision} + T_{DIFS}) + E[n_{tx_r}](T_{busy} + T_{DIFS})$$

where $T_{success}$ denotes the time spent on the final attempt for which an acknowledgement (ACK) is successfully received and thus indicates a successful packet transmission, $E[BO_r]$ denotes an average backoff window size for each attempt, $E[n_{tx_r}]$ denotes the average number of transmissions for other stations accessing the medium, $t_{slot}$ denotes a time slot interval, r denotes the number of attempted retransmissions, $T_{collision}$ denotes the time wasted in a collision, $T_{DIFS}$ denotes a defined time for which the medium must be idle before retransmitting or starting transmission of a new packet, and $T_{busy}$ denotes times that other stations are accessing the medium.

5. The apparatus of claim 1, wherein the slice deadline is variably set depending on a type of the slice.

6. The apparatus of claim 1, wherein the transmitting unit further comprises an ACK receiver determining whether the packet succeeds in transmission.

7. An encoded video stream transmitting method of transmitting a frame including at least one or more slice, comprising:

transmitting the slice in units of a packet within a slice deadline, which is a time limit required for transmission of the slice, a header packet that contain a slice header information being preferentially transmitted over other packets, and the slice header information comprising of information necessary for restoring the slice;

retransmitting the packet within a predetermined retry limit when the packet fails to be transmitted, and when the packet succeeds in transmission, a transmission of the next available packet beings; and dynamically calculating a packet deadline, which is a transmission time limit for each packet of a slice following the header packet, the packet deadline is calculated by dividing the remaining time to the slice deadline by the number of packets in the slice, wherein, the remaining time is computed by subtracting the time taken to transmit the header packet from the slice deadline, wherein the retransmitting the packet comprises retransmitting the header packet even when the number of retransmissions of the header packer exceeds the predetermined retry limit, under the time constraint of the slice deadline.

8. The encoded video stream transmitting method of claim 7, further comprising of dynamically resetting the retry limit such that predicted packet delay $E[T_{delay_r}^{pkt}]$, which is a running average of the delay incurred per retry attempt, satisfies a condition in which the predicted packet delay is less than or equal to the packet deadline.

* * * * *